US012376696B1

(12) United States Patent
Russell

(10) Patent No.: US 12,376,696 B1
(45) Date of Patent: Aug. 5, 2025

(54) LOCKING APPARATUS FOR COMMUNITY MAILBOX

(71) Applicant: Kevin Russell, Bakersfield, CA (US)

(72) Inventor: Kevin Russell, Bakersfield, CA (US)

(*) Notice: Subject to any disclaimer, the term of this patent is extended or adjusted under 35 U.S.C. 154(b) by 0 days.

(21) Appl. No.: 19/193,745

(22) Filed: Apr. 29, 2025

(51) Int. Cl.
*A47G 29/124* (2006.01)
*A47G 29/12* (2006.01)
*E05B 65/00* (2006.01)
*E05C 19/08* (2006.01)

(52) U.S. Cl.
CPC ....... *A47G 29/124* (2013.01); *A47G 29/1201* (2013.01); *E05B 65/00* (2013.01); *E05C 19/08* (2013.01)

(58) Field of Classification Search
CPC .............. A47G 29/124; A47G 29/1201; A47G 29/1245; A47G 2029/1257; E05B 65/44; E05B 65/462; E05B 65/467; E05B 65/468; E05B 67/36; E05B 67/38; E05B 67/383; E05B 65/00; E05C 19/08
See application file for complete search history.

(56) References Cited

U.S. PATENT DOCUMENTS 1,004,758 A * 10/1911 Ebbert .................. E05B 65/467 70/423
1,318,800 A * 10/1919 Radcliff .................. E05C 19/08 292/281
1,342,361 A * 6/1920 Veith ........................ E05C 19/08 292/281
1,365,960 A * 1/1921 Abbett ................... A47G 29/12 312/287
1,389,450 A * 8/1921 Kules ....................... E05C 19/08 292/281
2,913,296 A 7/1957 Martin
2,803,512 A * 8/1957 Band ...................... E05B 65/467 312/298
3,893,740 A 7/1975 England
4,486,057 A * 12/1984 Siwy ........................ E05C 19/08 292/281
4,852,920 A * 8/1989 DeForrest, Sr. ......... E05B 67/38 292/281
5,103,659 A 4/1992 Benefield, Sr.
5,172,574 A 12/1992 Perfetto
5,267,688 A * 12/1993 Benefield ........... A47G 29/1201 70/164

(Continued)

FOREIGN PATENT DOCUMENTS

GB 2509899 A 7/2014

*Primary Examiner* — William L Miller
(74) *Attorney, Agent, or Firm* — James M. Duncan; Young Wooldridge, LLP

(57) ABSTRACT

A locking apparatus for a community mailbox prevents the opening of the main access door through which a mail carrier may gain access to the interiors of all of the individual mailboxes of the community mailbox. The locking apparatus has a mounting plate which is configured to be attached to an outer housing of the community mailbox. A stop plate is pivotally attached to the mounting plate. The stop plate is configured to be locked into a first position which prevents the opening of the main access door. The stop plate is further configured such that when unlocked, the stop plate may be pivoted into a second position which allows the opening of the main access door.

15 Claims, 10 Drawing Sheets

(56) References Cited

U.S. PATENT DOCUMENTS

| | | | | | |
|---|---|---|---|---|---|
| 5,794,844 | A * | 8/1998 | Jenkins | E05B 17/0037 | 292/120 |
| 5,934,111 | A * | 8/1999 | Hernandez | E05C 19/08 | 292/281 |
| 6,247,641 | B1 * | 6/2001 | Noblet | A47G 29/1201 | 232/24 |
| 6,327,878 | B1 | 12/2001 | Levenson | | |
| 6,520,405 | B1 * | 2/2003 | Braxter | E05C 19/08 | 70/2 |
| 7,748,606 | B2 * | 7/2010 | Mikolajczyk | E05B 17/2088 | 70/416 |
| 12,241,294 | B1 | 3/2025 | Russell | | |
| 2003/0136159 | A1 * | 7/2003 | Vito | E05C 19/08 | 70/56 |
| 2006/0101874 | A1 * | 5/2006 | Mikolajczyk | E05B 63/14 | 70/84 |
| 2006/0255116 | A1 * | 11/2006 | Yong | A47G 29/1201 | 232/24 |
| 2014/0167574 | A1 * | 6/2014 | Shoenfeld | A47B 88/994 | 312/215 |
| 2023/0212895 | A1 * | 7/2023 | Hodge | E05B 65/48 | 70/78 |
| 2024/0318468 | A1 * | 9/2024 | Cordova | E05B 67/383 | |
| 2025/0003271 | A1 * | 1/2025 | Cordova | E05B 67/383 | |

* cited by examiner

LOCKING APPARATUS FOR COMMUNITY MAILBOX

BACKGROUND OF THE INVENTION

Community mailboxes, such as that disclosed in U.S. Pat. No. 6,247,641, and as shown in FIG. 1 herein are known for providing receipt of mail for multiple recipients, with each recipient having a dedicated box for receiving pieces of mail. Each dedicated box has a locking access door whereby each recipient can open with their assigned key to gain access to their mail. The community mailbox also has parcel receipt boxes. A mail carrier may deliver larger parcels to the parcel receipt boxes and leave the key to a specific parcel receipt box in the appropriate dedicated box. The community mailbox also has an outgoing mail drop box. The outgoing mail drop box has a slot through which outgoing mail may be deposited for pickup by a mail carrier. The mail carrier has the key for opening the door to the outgoing mail drop box to collect any mail deposited into the box.

As shown in FIG. 2, the community mailbox has double swinging doors which allow the mail carrier to gain access to the interiors of each individual box allowing the easy depositing of each recipient's mail into that recipient's dedicated box. The double swinging doors are opened by levers which are accessible to the mail carrier through the outgoing mail drop box. Thus, a mail carrier gains access to all the individual boxes and the parcel receipt boxes of the community mailbox by unlocking and opening the door of the outgoing mail drop box and thereafter dactivating the levers which open the double swinging doors. While providing convenient access for the mail carrier, this configuration also allows a thief to gain access to all the mail delivered to the community mailbox by drilling out the single lock of the outgoing mail drop box and actuating the levers of the double swinging doors, thereby allowing the opening of the double swinging doors into the position shown in FIG. 2, such that a thief has access to all of the individual boxes and to the parcel receipt boxes.

Various solutions have been suggested to prevent theft of mail from community mailboxes. For example, one proposed solution is to install locking panels which bar access to all of the individual mailboxes. Another proposed solution is to place protective gates which prevent access to all of the individual mailboxes. However, the disadvantage of both solutions is that each system requires that each mail recipient having a mailbox in the community mailbox have the key or combination to the panels or protective gates, thereby creating inconvenience to each recipient and the possibility of a recipient either failing to relock the panels or protective gates. In addition, because each mail recipient has a key or combination to the panels or protective gates, there is an increased likelihood of the key or combination becoming available to unauthorized persons.

U.S. Pat. No. 12,241,294, issued to the present inventor, provides a solution to the above-described problem. The apparatus disclosed in the '294 patent teaches a lock which is removed from the apparatus each time a mail carrier wishes to open the outgoing mail drop box. The presently disclosed invention provides a modification of the apparatus disclosed in the '294 patent in which the lock may be unlocked yet remain attached to the apparatus such that removal of the lock from the apparatus is not required to open the outgoing mail drop box.

SUMMARY OF THE INVENTION

The presently disclosed locking apparatus provides a solution to the above-described problem by providing a locking apparatus which addresses the problem by preventing the opening of the door of the outgoing mail drop box and thereby preventing access to the levers which allow opening the double swinging doors. Unlike the above-described solutions, the present invention may only be opened by the mail carrier, and it does not impose any inconvenience to the individual mail recipients, and it only allows the locking apparatus to be opened by the mail carrier.

For purposes of this disclosure, a "community mailbox" is generally shown in FIGS. 1-2 and is of the type having an outer housing, a first double door, a second double door, and a mail access door, wherein the first double door and the second double door are configured to be opened by accessing a latch mechanism through the mail access door. Only the mail carrier will have the key to the mail access door which, but for tampering with the locking mechanism, only allows the mail carrier access to all of the individual mailboxes.

This latch mechanism is referred to within U.S. Pat. No. 6,247,641 as a "sliding linkage lever" which the post person lifts to disengage door pins "so that both doors are able to swing free and expose all of the interior mail slots." Once the double doors have been opened, a mail carrier may easily place mail into each of the individual mailboxes or place parcels into the parcel receipt boxes. When the double doors have been closed, each individual with a mailbox may retrieve their mail separately by opening the door to their mailbox with a key unique to their mailbox. Unfortunately, if the locking mechanism of the mail access door is defeated by drilling out the mechanism or by otherwise defeating the single lock, a thief will have access to all of the mail deposited within the community mailbox.

An embodiment of the disclosed locking apparatus may comprise a device which may be independently locked to prevent the opening of the mail access door—thereby preventing access to the interior latch mechanism—while still allowing the opening of each of the doors to the individual mailboxes by the mail recipients. A method preventing access to the interior latch mechanism is disclosed herein, where the method is to attach a locking apparatus to the community mailbox where the locking apparatus comprises a stop plate having a first position where the stop plate is disposed immediately adjacent the mail access door thereby preventing opening of the mail access door but allowing the opening of the individual mailbox doors. The stop plate has a second position which allows opening of the mail access door. The stop plate may be locked into the first position with a lock. The mail carrier will have a key or combination to the lock, thereby allowing the mail carrier to open the mail access door and activate the interior latch mechanism and gain access to all of the individual mailboxes.

An embodiment of the disclosed locking apparatus may also comprise a mounting plate which is configured to attach to an outer housing of the community mailbox. A stop plate is pivotally attached to the mounting plate by a hinge. The stop plate is configured to pivot from a first position to a second position. In the first position, the stop plate is adjacent to the door of the outgoing mail drop box and prevents the door from swinging open. If the door cannot be swung open, there is no access to the levers which allow the double swinging doors to open. When the stop plate is pivoted to the second position, the door of the outgoing mail drop box may be opened and thereby allow access to the levers which allow the double swinging doors to open. A lock prevents the stop plate from pivoting from the first position to the second position until the lock is unlocked by the mail carrier.

The lock is attached to the stop plate, thereby allowing the mail carrier to pivot the stop plate into the second position without having to remove the lock from the apparatus, facilitating the process for the mail carrier. In one embodiment, the lock may be attached to the stop plate by one or more fasteners which extend through one or more non-threaded apertures of the stop plate into a corresponding threaded aperture on the back of the lock.

DETAILED DESCRIPTION OF THE INVENTION

Figure 1:
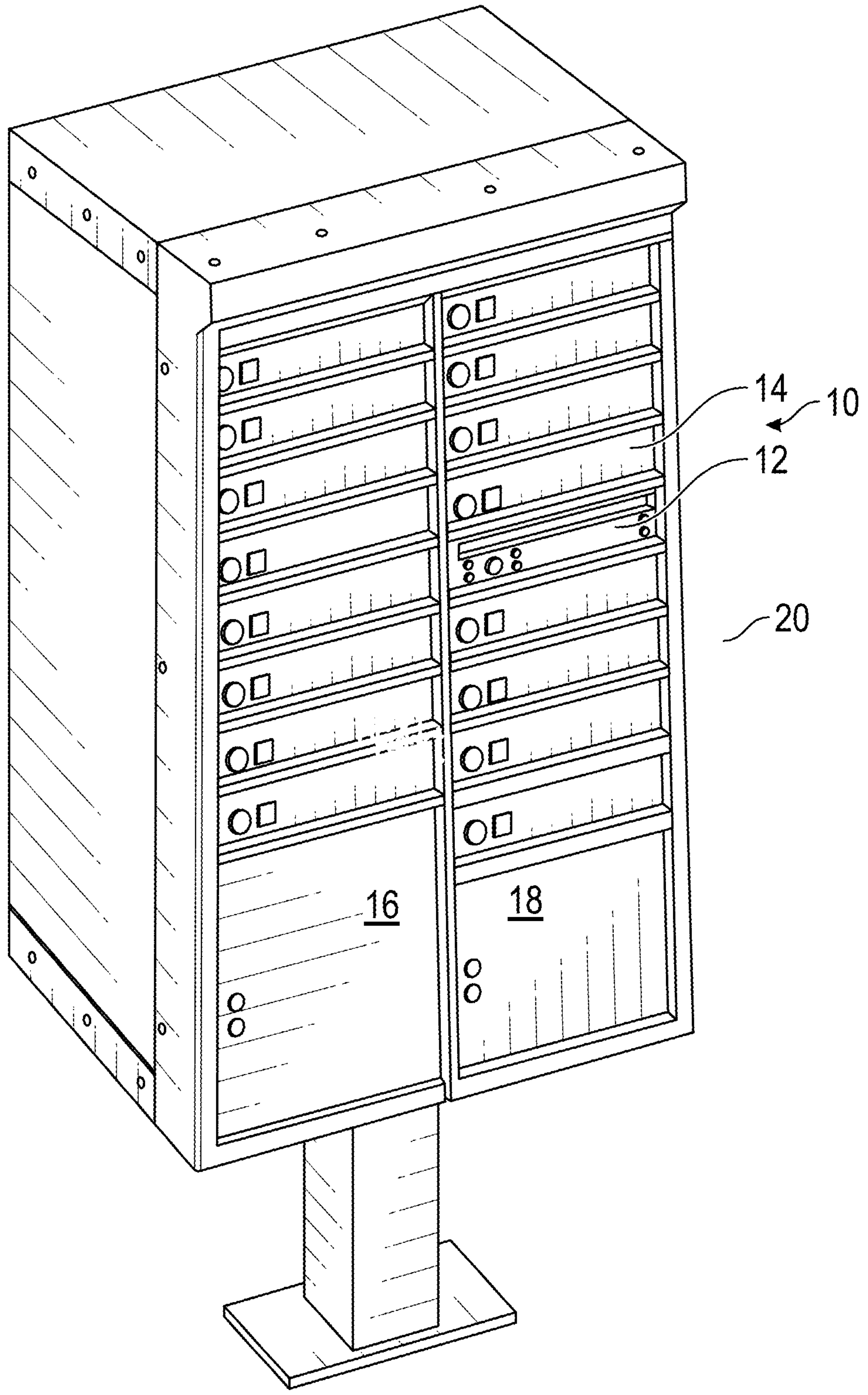
FIG. 1 (Prior Art)
FIG. 1 depicts an embodiment of a known community mailbox in a closed position.
Figure 2:
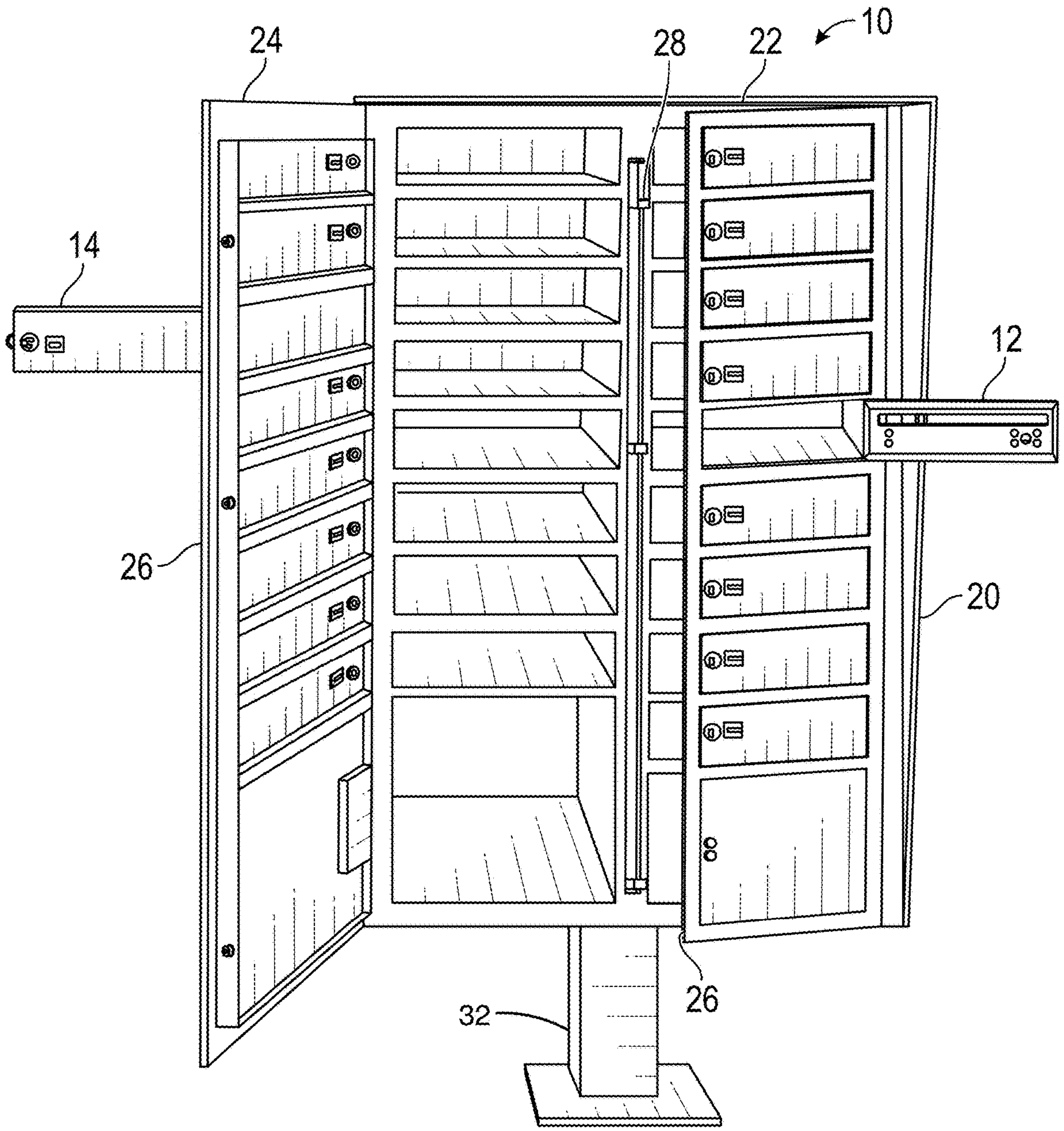
FIG. 2 (Prior Art)
FIG. 2 shows the community mailbox of FIG. 1 in an open position.

Referring now to the drawing figures, FIGS. 1-2 depict a known community mailbox which may be further secured by utilizing the presently disclosed locking apparatus. As shown in FIGS. 1-2, the community mailbox 10 has a main access door 12 to which a mail carrier will have a key for opening. The term "main access door" shall be understood within this disclosure to be referring a door of the community mailbox which the mail carrier may open to gain access to an interior latch mechanism which allows the mail carrier to gain access to all the internal boxes contained within the community mailbox 10.

The main access door 12 will typically have a mail slot through which outgoing mail may be deposited into an outgoing mail drop box for pick up by the mail carrier. The community mailbox 10 has a plurality of individual mail compartments disposed within an array enclosed within an outer housing 20. Each individual mail compartment is enclosed by an individual mailbox door 14, each having a separate key assigned to the owner of that mailbox. The term "main access door" is defined herein to refer only to main access door 12 and specifically excludes any of the individual mailbox doors. Likewise, the term "individual mailbox doors" does not include main access door 12. The community mailbox 10 may also have a large package door 16 and a small package door 18 which allow the mail carrier to deposit packages intended for specific mail recipients into the enclosures behind those doors and leave a key to either the large package door or small package door inside a particular mailbox, allowing the package recipient to gain access to the package enclosures. Large package door 16 and small package door 18 are included within the term "individual mailbox door" but not within the term "main access door". Community mailbox 10 has outer housing 20 which provides for an enclosure of all the individual mailboxes. Community mailbox 10 may be mounted on vertical column 32.

A mail carrier opens main access door 12 by using a key which fits lock 30. Once the main access door 12 is opened as shown in FIG. 2, there is access to the interior latch mechanism 28 which allows the first double door 22 and the second double door 24 to be swung open. Second double door 24 may have a door flange 26 which engages a corresponding door flange 26 of first double door 22, thereby preventing first double door 22 from opening until second double door 24 has been opened, or vice-versa.

FIGS. 3A-3C and 4 show different embodiments of the presently disclosed locking apparatus 100, 100' attached to community mailbox 10. As shown in the figures, locking apparatus 100, 100' may be utilized to prevent the opening of main access door 12 when the locking apparatus is in a locked position but allowing each of the individual mailbox doors 14, the large package door 16 and a small package door 18 to be opened as desired with the locking apparatus in the locked position. The figures depict the locking apparatus 100, 100' where the stop plate 104, 104' of the apparatus is locked with the stop plate disposed immediately adjacent the main access door 12. When the locking apparatus 100, 100' is locked it prevents the opening of the mail access door 12 thereby preventing access to the interior latch mechanism 28. Thus, the utilization of the presently disclosed locking apparatus 100, 100' in conjunction with community mailbox 10 provides a means for resisting the opening of the mail access door 12 and thereby preventing access to the interior latch mechanism 28 by unauthorized persons.

Figure 3A:
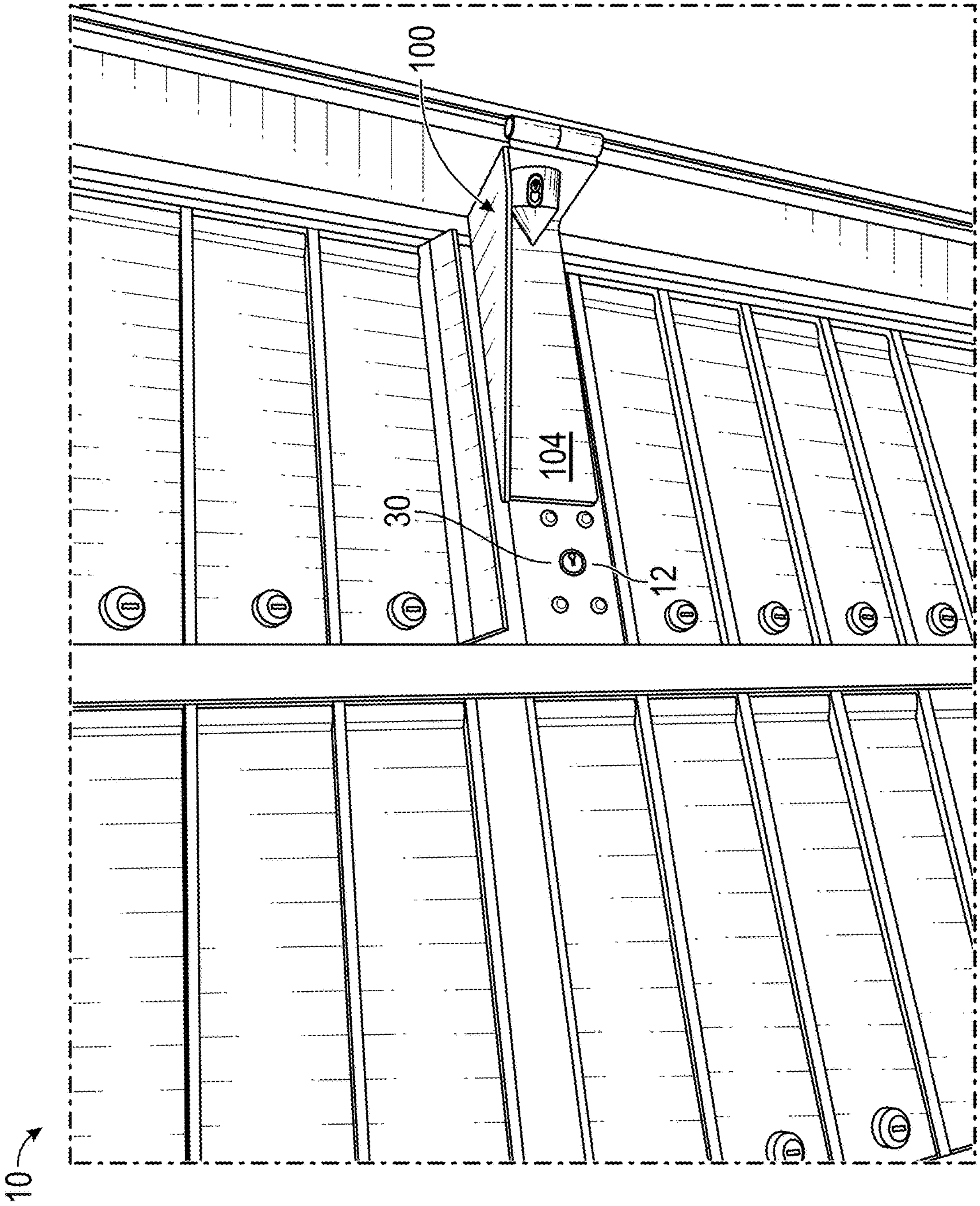
FIG. 3A depicts an embodiment of the disclosed locking apparatus installed on a community mailbox.
Figure 3B:
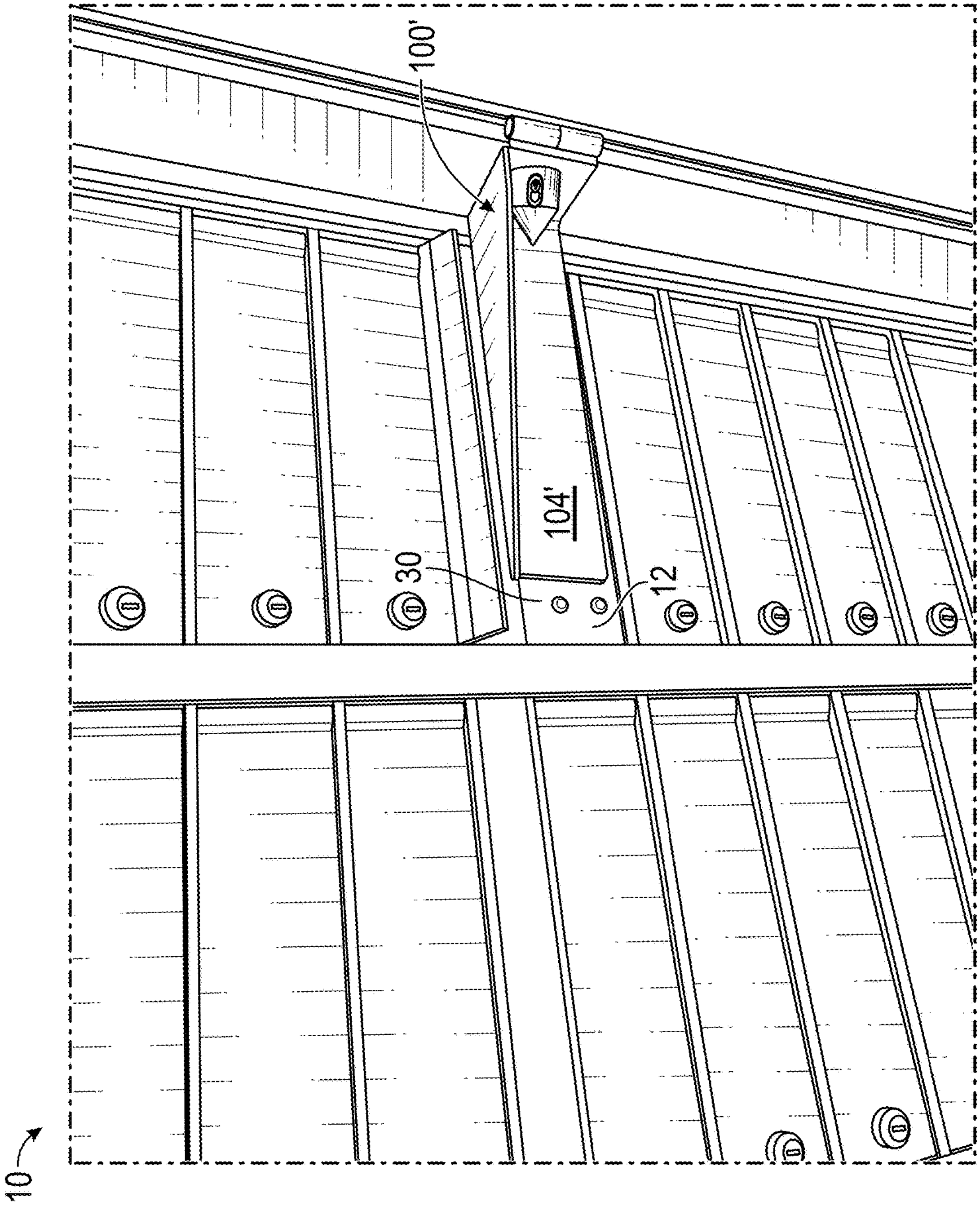
FIG. 3B depicts a second embodiment of the disclosed locking apparatus installed on a community mailbox.
Figure 3C:
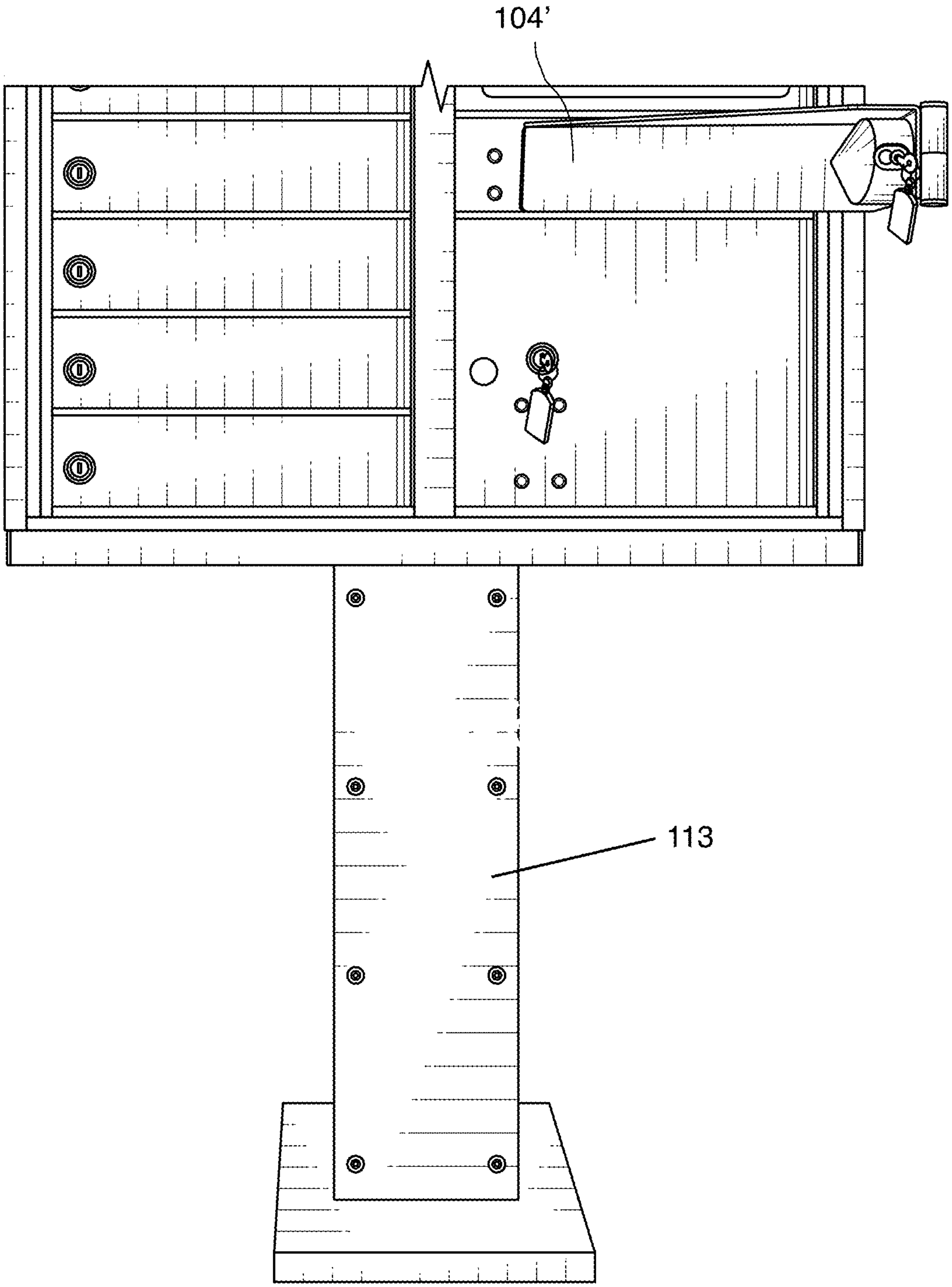
FIG. 3C depicts the second embodiment of the disclosed locking apparatus wherein the community mailbox has been further safeguarded with a shield attached to the vertical support member.
Figure 4:
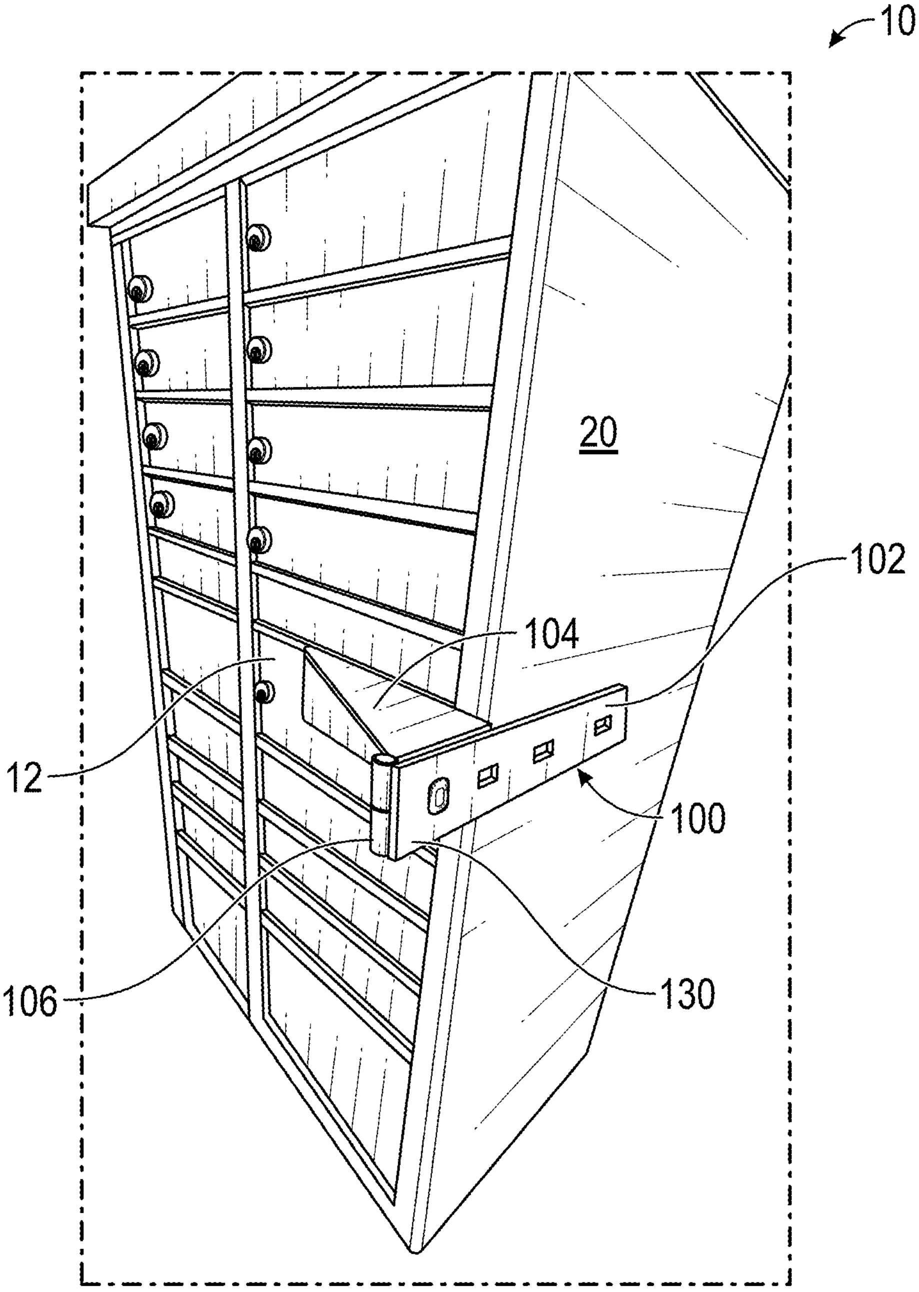
FIG. 4 shows an oblique view of the community mailbox showing how the disclosed locking apparatus is attached.

As shown in FIGS. 3B-3C, an embodiment of the locking apparatus 100' may have a stop plate 104' which extends over the lock 30 of the main access door 12 to prevent any tampering or damaging of the lock. FIG. 3C further depicts a community mailbox 10 further comprising a shield 113 mounted over the existing vertical column 32 to discourage a thief from cutting through the vertical column 32 of the community mailbox 10. Shield 113 may be fabricated from any material which is resistant to cutting devices, but which may easily be installed to or over vertical column 32, such as aluminum plate.

Figure 8:
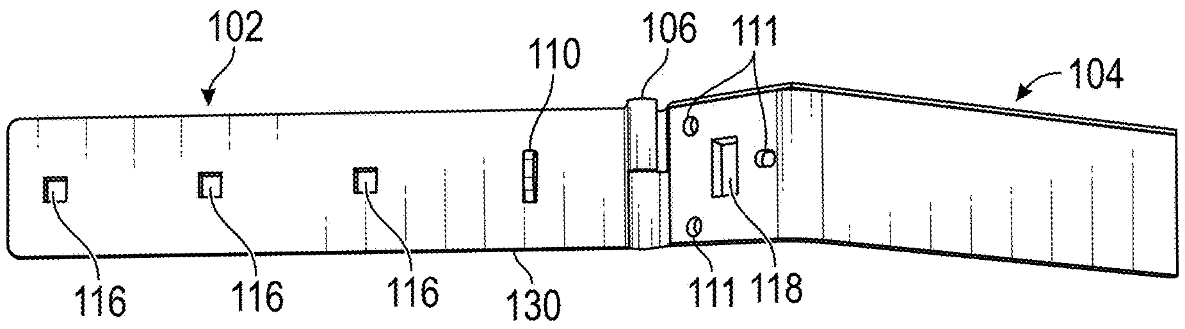
FIG. 8 shows a front perspective view of the disclosed locking apparatus pivoted into an open position.

As illustrated in the figures, an embodiment of the disclosed locking apparatus 100 has a mounting plate 102 which attaches to the outer housing 20 by welding, by fasteners, such as carriage bolts, through bolt apertures 116, or by a combination of both. Stop plate 104 is pivotally attached to mounting plate 102 by a hinge 106 or the like. Stop plate 104 comprises a first vertical member 105. Stop plate 104 may be pivoted to a first position in which vertical member 105 abuts the main access door 12 but does not abut any of the other individual mailbox doors 14, 16, 18. Stop plate 104 further comprises a second vertical member 107 which attaches to mounting plate 102. As shown in the figures, first vertical member 105 and second vertical member 107 are formed in a right-angle configuration, typically from a single piece of structural steel. Second vertical member 107 comprises a lock engagement surface 109 to which a lock 120 is attached as discussed below. Lock 120 may be activated to lock stop plate 104 to maintain it in the first position. Lock engage surface 109 may comprise one or more non-threaded apertures 111 which extend completely through second vertical member 107 as shown in FIG. 8 and utilized to attach lock 120 to the lock engagement surface 109.

Figure 9:
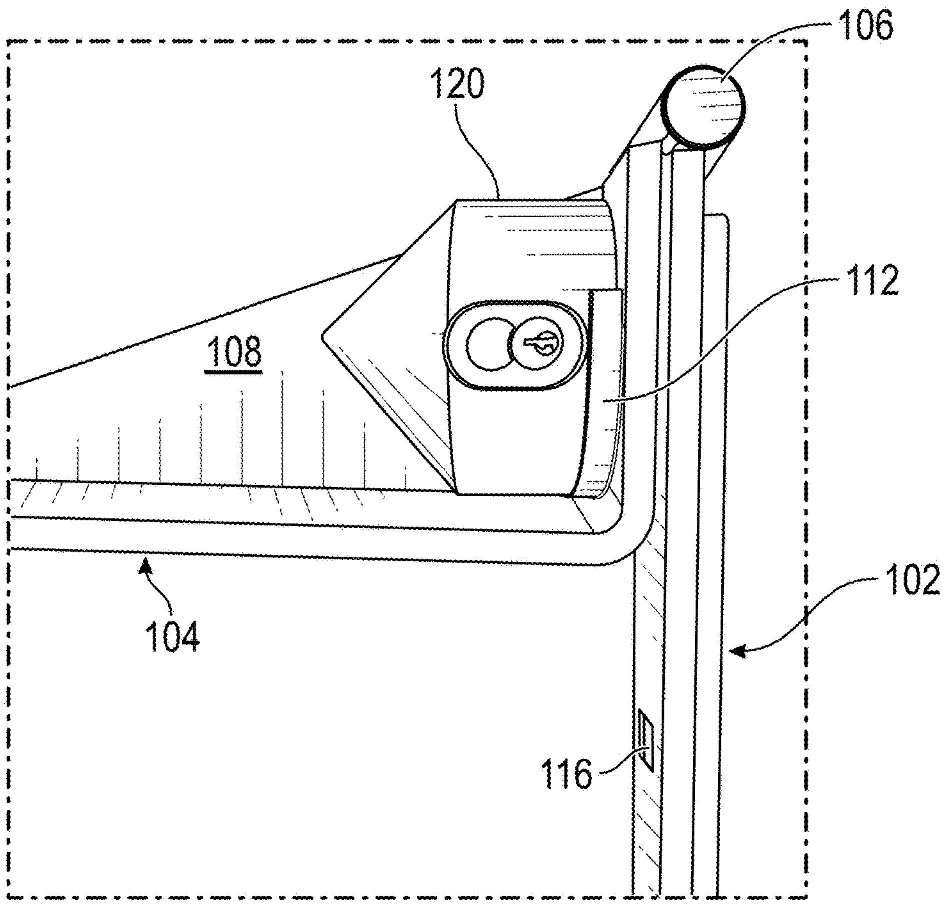
FIG. 9 shows a bottom perspective view of the disclosed locking apparatus in a closed position with a lock attached within a right-angle corner of the stop plate.

Stop plate 104 may also have a top plate 108 which provides additional strength to the stop plate while also providing a barrier to the use of any device such as a hammer, drill, pry bar or the like on lock 120 which may be nestled within the protection of a right-angle corner of the stop plate 104 as shown in FIG. 9. Top plate 108 may either be a separate piece of structural steel welded to the top of stop plate 104 or top plate 108 may be an integral portion of the stop plate formed by heating and bending.

Figure 5:
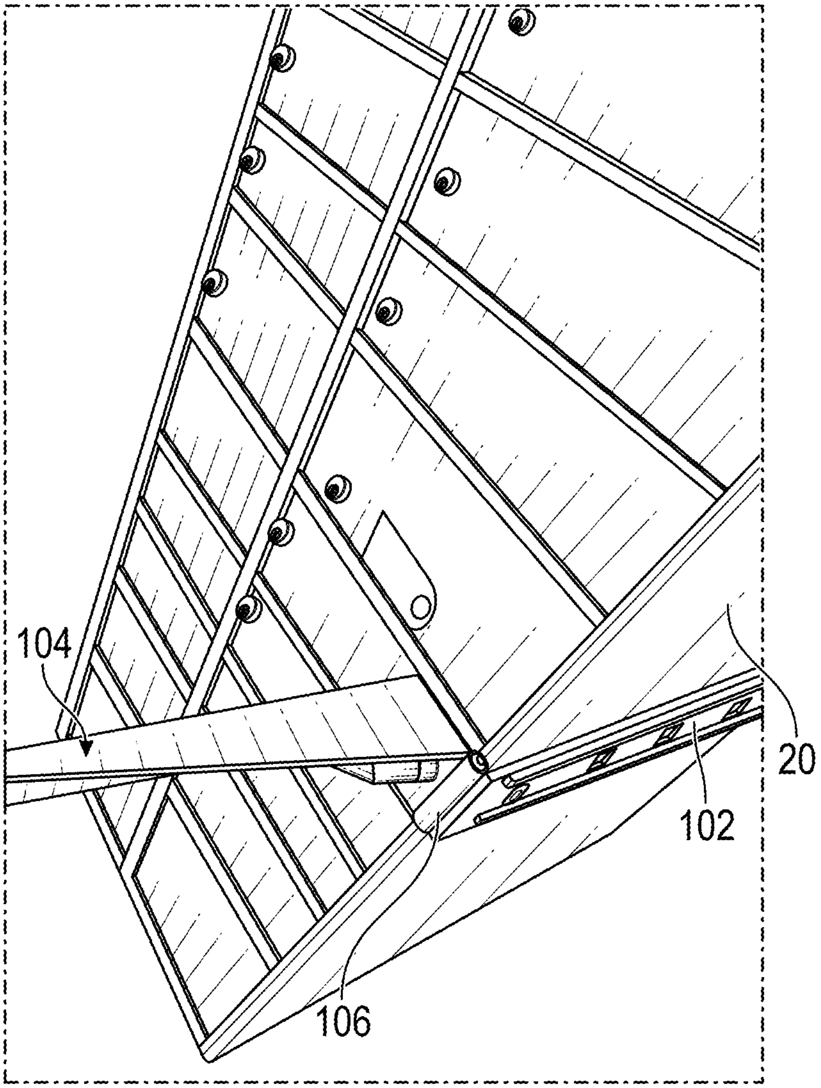
FIG. 5 shows the locking apparatus shown in FIG. 4 with the locking apparatus in an open position.
Figure 6:
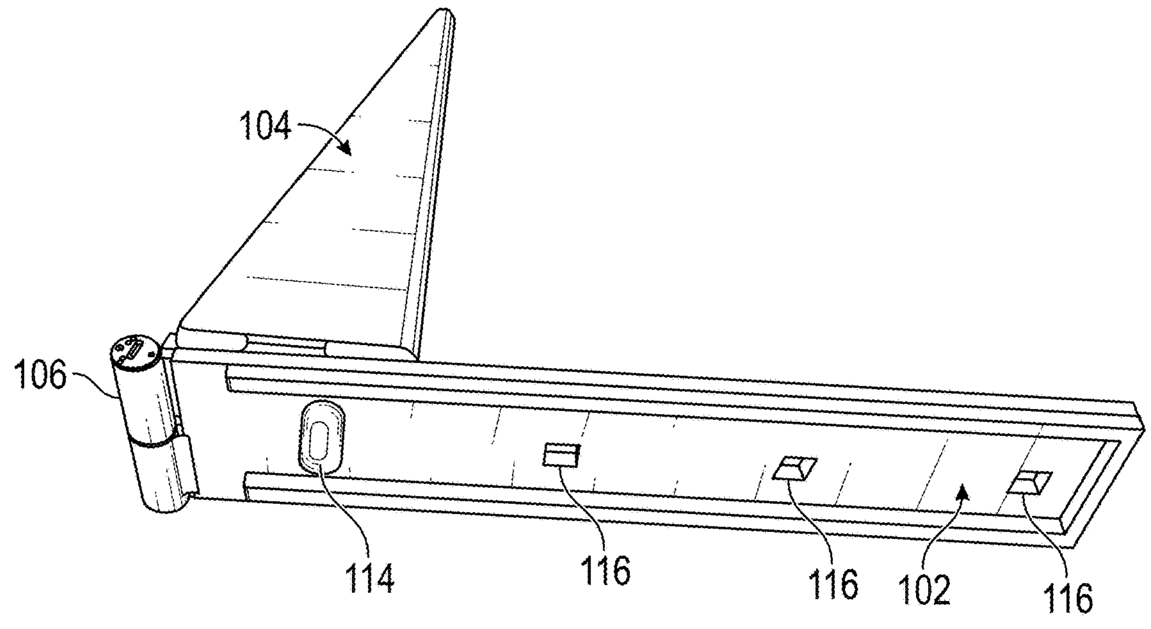
FIG. 6 shows a rear perspective view of the disclosed locking apparatus in a closed position.

FIG. 5 shows an embodiment of the disclosed locking apparatus 100 in an open position, also referred to herein as the second position. When the locking apparatus 100 is in the second position, mail access door 12 may be freely swung open thereby allowing access to interior latch mechanism 28. With this configuration, a mail carrier having either a key or combination to lock 120 may unlock the lock. Upon completion of the mail delivery, the mail carrier may close first double door 22, second double door 24, shut mail access door 12, return stop plate 104 into the first position, and attach and relock lock 120.

In an embodiment of the disclosed locking apparatus 100 the mounting plate 102 may have an end portion 130 which extends outwardly beyond the outer housing 20 of the community mailbox 10 with hinge 106 positioned at the end of the end portion. In this configuration, a hasp 110 may be attached to end portion 130. Hasp 110 is attached on mounting plate 102 such that it aligns with an opening 118 of stop plate 104 as the stop plate 104 is pivoted into the first position. Upon the pivoting of the stop plate 104 into the first position, opening 118 receives hasp 110. Upon the stop plate 104 reaching the first position, a portion of hasp 110 extends through opening 118 and into a slot on the backside of lock 120, where it can be engaged by lock shackle 124. Hasp 110 may be configured to have a structural integrity consistent with the mounting plate 102 with hasp 110 comprising a thick steel construction. Hasp 110 may be attached to the mounting plate 102 by insertion of the hasp through an opening in the mounting plate and attaching by welding leaving hasp attachment weld 114.

An embodiment of a lock 120 which works with the disclosed apparatus is depicted in FIG. 9. Lock 120 is fixedly attached to lock engagement surface 109 and is configured to receive hasp 110 through a slot in the backside 122 of the lock, with the lock shackle 124 engaging and disengaging from hasp 110 without removal of the lock from the lock engagement surface. This type of lock is generally referred to as a "hidden shackle lock".

Figure 7:
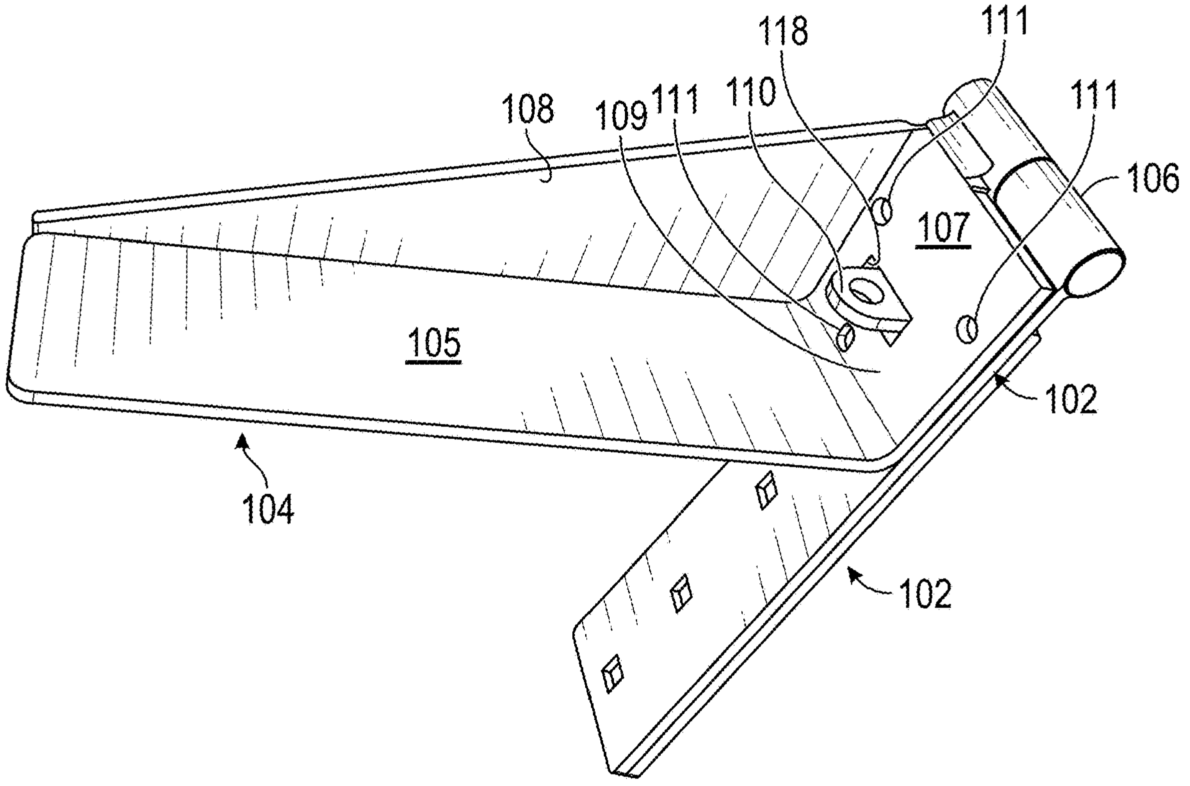
FIG. 7 shows a lower front perspective view of the disclosed locking apparatus, with the lock removed, in a closed position.

When an embodiment of the disclosed locking apparatus 100 is in the first position, hasp 110 extends through an opening 118 in stop plate 104 as shown in FIGS. 7-8. When so configured, lock 120 may be manually activated by turning a key or other mechanism to cause lock shackle 124 to engage hasp 110 and thereby lock stop plate 104 in the locked position and thereby prevent opening of mail access door 12. As depicted in the figures, an embodiment of lock 120 may have a conically-shaped outwardly extending side to discourage efforts to penetrate that side of the lock with a drill or other impact type of device.

Figure 10:
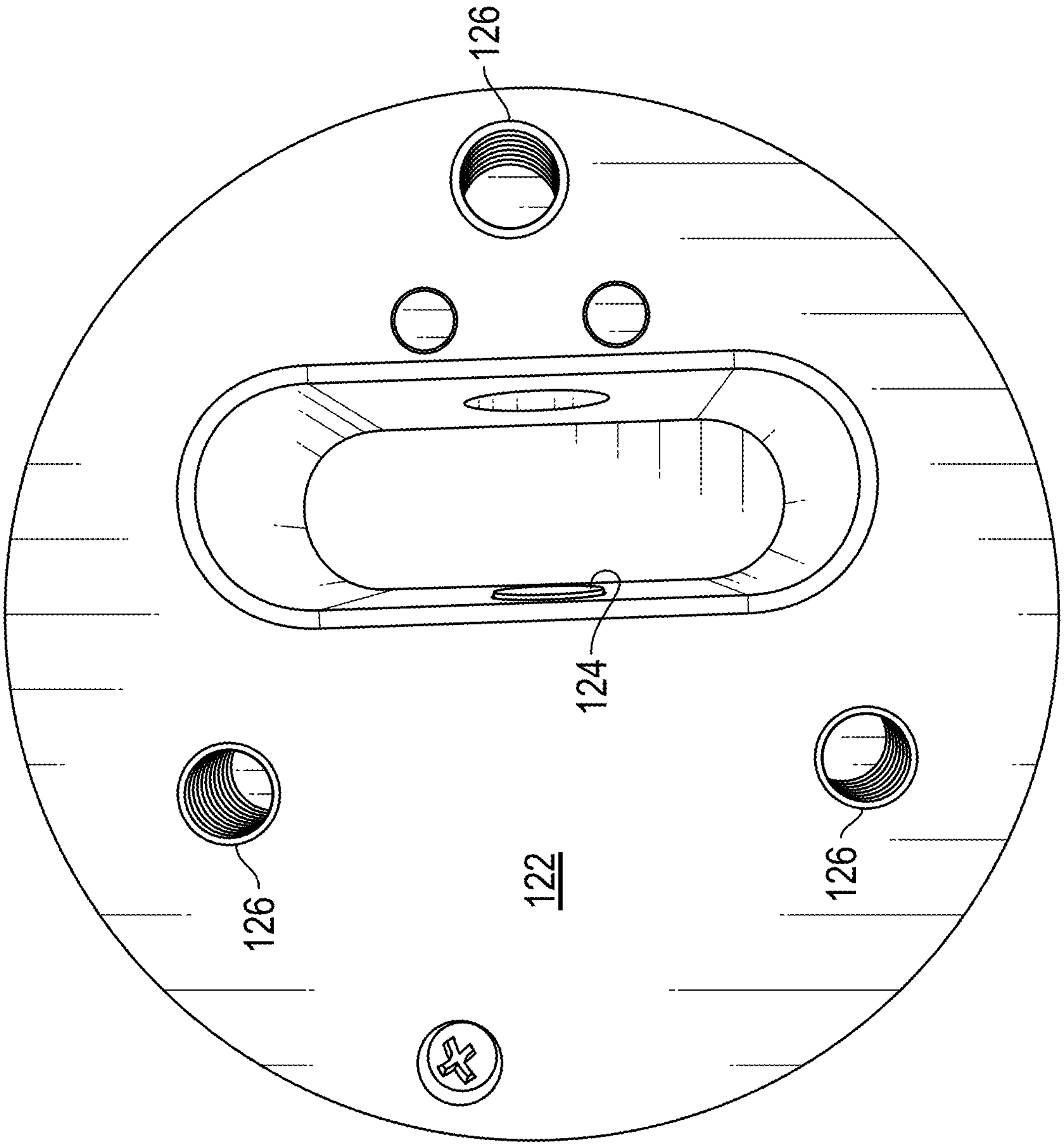
FIG. 10 shows a back view of an embodiment of a lock which may be utilized with embodiments of the apparatus.

While lock 120 may be attached to lock engagement surface 109 by a variety of means, including brazing, high strength adhesives, and the like, the embodiment of lock 120 depicted in FIG. 10 has a backside 122 having threaded apertures 126 which are configured to receive fasteners which extend through non-threaded apertures 111 of lock engagement surface 109 of stop plate 104 and made up into the threaded apertures. The backside 122 may be attached so that it is in flush engagement with lock engagement surface 109 or may be disposed spaced-apart from the lock engagement surface by washers, spacers or the like.

A method of locking and unlocking a community mailbox 10 is realized through the use of embodiments of the above-described locking apparatus 100. The method comprises the steps of attaching an embodiment of the locking apparatus 100 to a community mailbox, placing the stop plate 104 in the first position, and manually activating the lock 120 which causes lock shackle 124 to engage hasp 110.

Having thus described the preferred embodiment of the invention, what is claimed as new and desired to be protected by Letters Patent includes the following:

1. A locking apparatus for use in combination with a community mailbox, wherein the community mailbox comprises a plurality of individual mail compartments, each enclosed by an individual mailbox door, the plurality of individual mail compartments disposed in an array enclosed within an outer housing, wherein access to each one of the plurality of individual mail compartments is gained by activating a latch accessible through a main access door enclosing an outgoing mail drop box, the locking apparatus comprising:

a mounting plate configured to attach to a side of the outer housing of the community mailbox;

a stop plate pivotally attached to the mounting plate by a hinge, the stop plate comprising a first vertical member and a second vertical member wherein the first vertical member and the second vertical member are disposed in a right-angle configuration, the second vertical member comprising a lock engagement surface adjacent a right-angle corner of the stop plate, wherein the stop plate is configured to pivot from a first position wherein the first vertical member abuts the main access door without abutting any individual mailbox door to a second position; and a lock, the lock comprising a backside attached to the lock engagement surface, the lock configured to be manually engaged to lock the stop plate in the first position and the lock configured to be unlocked and allow the stop plate to pivot to the second position.

2. The locking apparatus of claim 1 further comprising a top plate attached to the first vertical member and the second vertical member.

3. The locking apparatus of claim 1 wherein the main access door comprises a key lock wherein in the first position the first vertical member extends over the key lock.

4. The locking apparatus of claim 1 wherein the lock comprises a hidden shackle lock.

5. The locking apparatus of claim 1 wherein the lock comprises a conically-shaped outwardly extending side.

6. The locking apparatus of claim 1 wherein the mounting plate comprises an end portion which extends outwardly beyond the outer housing of the community mailbox.

7. The locking apparatus of claim 6 wherein a hasp is attached to the end portion of the mounting plate, wherein the hasp extends through an opening in the lock engagement surface when the stop plate is in the first position.

8. The locking apparatus of claim 1 wherein the lock engagement surface comprises a non-threaded aperture and the backside of the lock comprises a threaded aperture and the lock is attached to the lock engagement surface by a fastener extending through the non-threaded aperture and into the threaded aperture.

9. The locking apparatus of claim 1 wherein the backside of the lock is in flush engagement with the lock engagement surface.

10. A method of locking and unlocking a community mailbox, the community mailbox having an outer housing, a first double door, a second double door, a main access door enclosing an outgoing mail drop box, and a plurality of individual mail compartments, each enclosed by an individual mailbox door, the plurality of individual mail compartments disposed in an array enclosed within the outer housing, wherein the first double door and the second double door are configured to be opened by accessing a latch through the main access door, wherein the method comprises the following steps:

attaching a locking apparatus to the community mailbox, wherein the locking apparatus comprises a mounting plate configured to a side of the community mailbox, a stop plate pivotally attached to the mounting plate, the stop plate comprising a first vertical member and a second vertical member wherein the first vertical member and the second vertical member are disposed in a right-angle configuration, wherein the second vertical member comprises a lock fixedly attached to a lock engagement surface, wherein the stop plate is configured to pivot from a first position adjacent the main access door to a second position, wherein, in said first position, the stop plate abuts the main access door without abutting any individual mailbox door and, in said second position, the stop plate does not abut the main access door;

placing the stop plate into the first position; and activating the lock to cause a shackle to engage a hasp which extends through the lock engagement surface when the stop plate is in the first position, thereby locking the stop plate in the first position.

11. The method of claim 10 wherein the stop plate comprises a top plate attached to the first vertical member and to the second vertical member.

12. The method of claim 10 wherein the mounting plate has an end portion which extends outwardly beyond the outer housing of the community mailbox.

13. The method of claim 12 wherein the hasp is attached to the end portion of the mounting plate, wherein the hasp extends through an opening in the lock engagement surface when the 16 stop plate is in the first position.

14. The method of claim 10 herein the lock engagement surface comprises a non-threaded aperture and the lock comprises a backside comprising a threaded aperture, wherein the lock is attached to the lock engagement surface by a fastener extending through the non-threaded aperture and into the threaded aperture.

15. The method of claim 14 wherein the backside of the lock is in flush engagement with the lock engagement surface.

* * * * *